Jan. 11, 1955     S. OVSHINSKY     2,699,084
MACHINE TOOL FOR MACHINING BRAKE DRUMS AND THE LIKE
Filed May 29, 1951     13 Sheets-Sheet 1
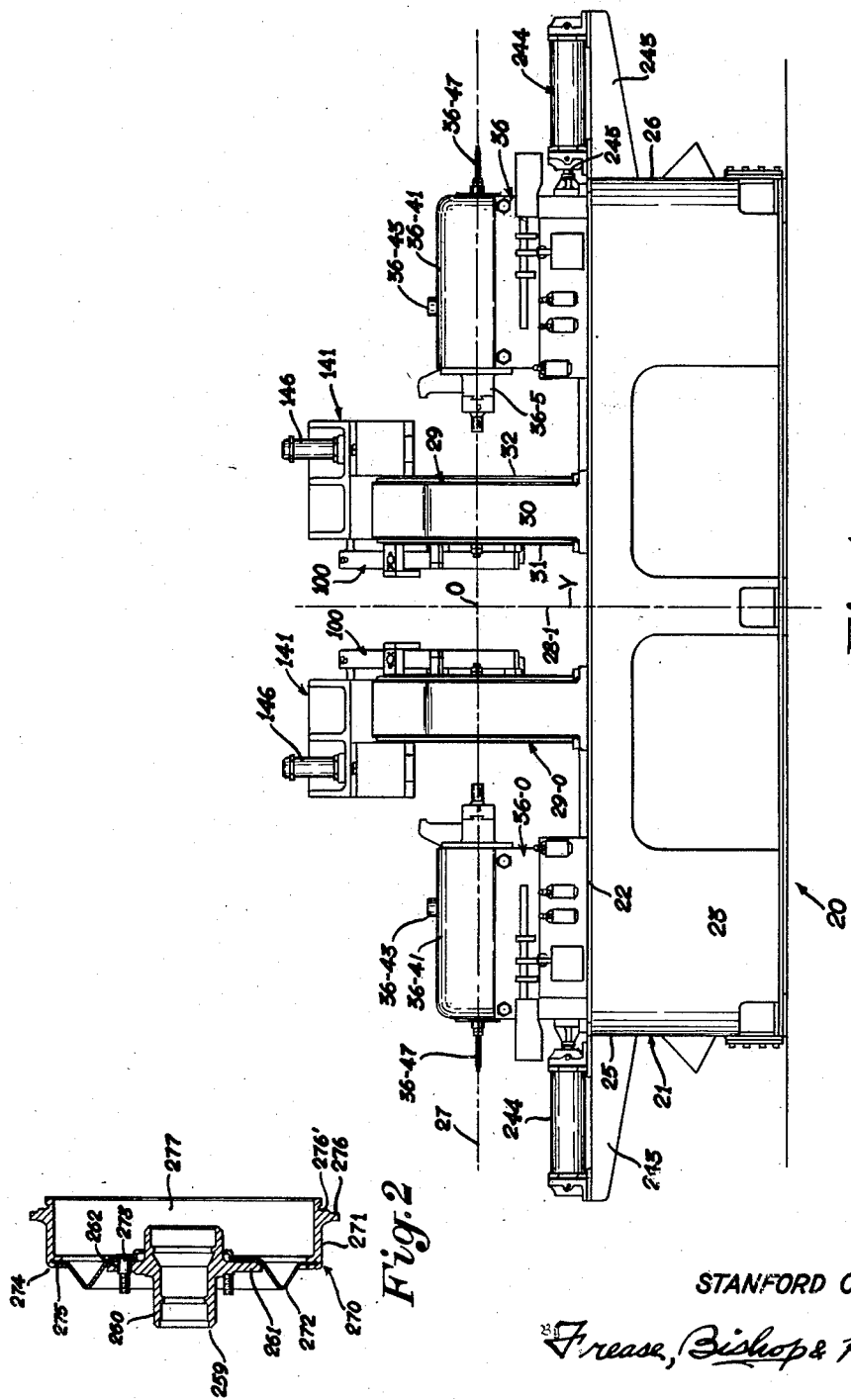
Inventor
STANFORD OVSHINSKY
Frease, Bishop & Hamilton
Attorneys Jan. 11, 1955     S. OVSHINSKY     2,699,084
MACHINE TOOL FOR MACHINING BRAKE DRUMS AND THE LIKE
Filed May 29, 1951     13 Sheets-Sheet 2

Inventor
STANFORD OVSHINSKY

By Frease, Bishop & Hamilton
Attorneys

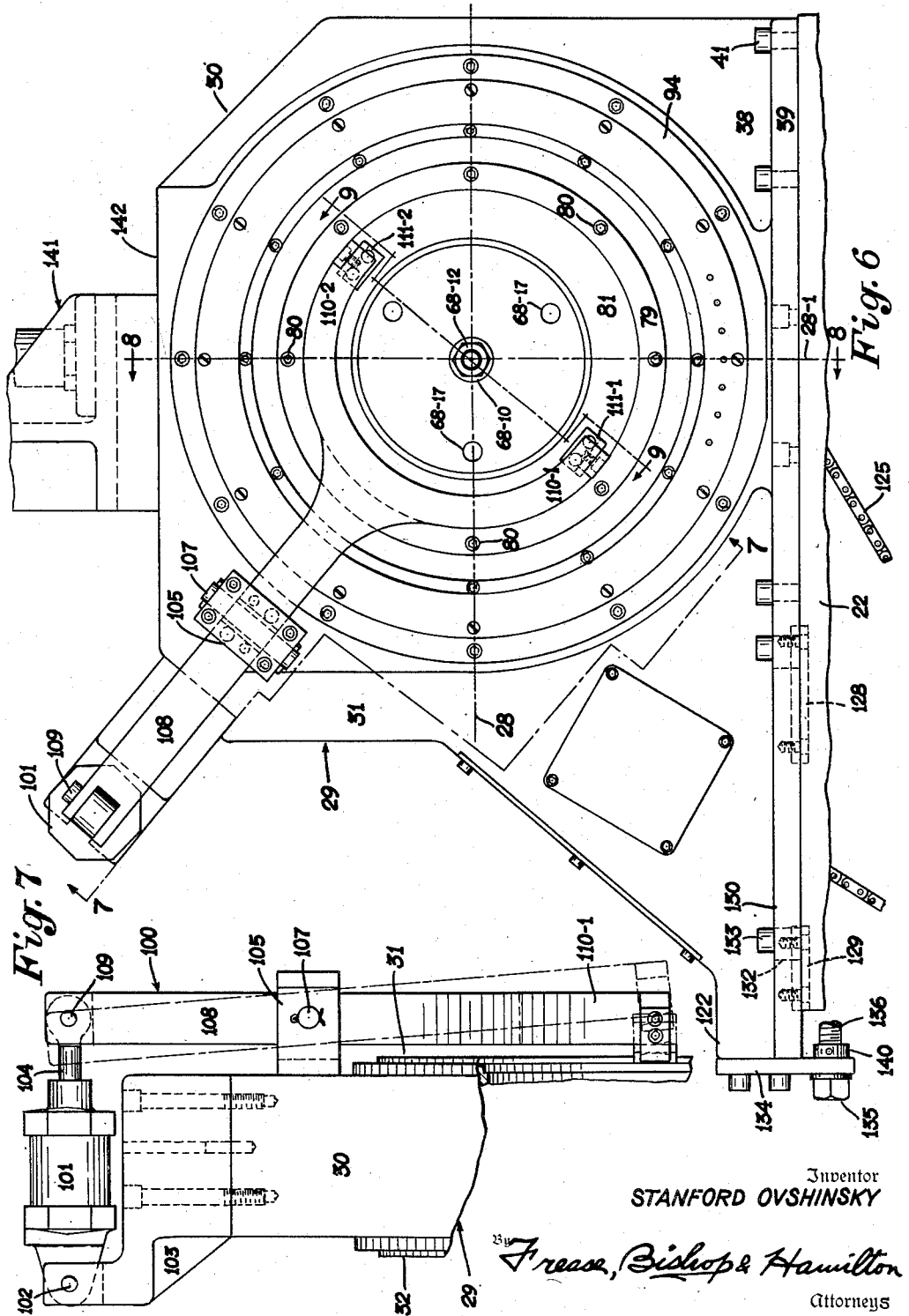

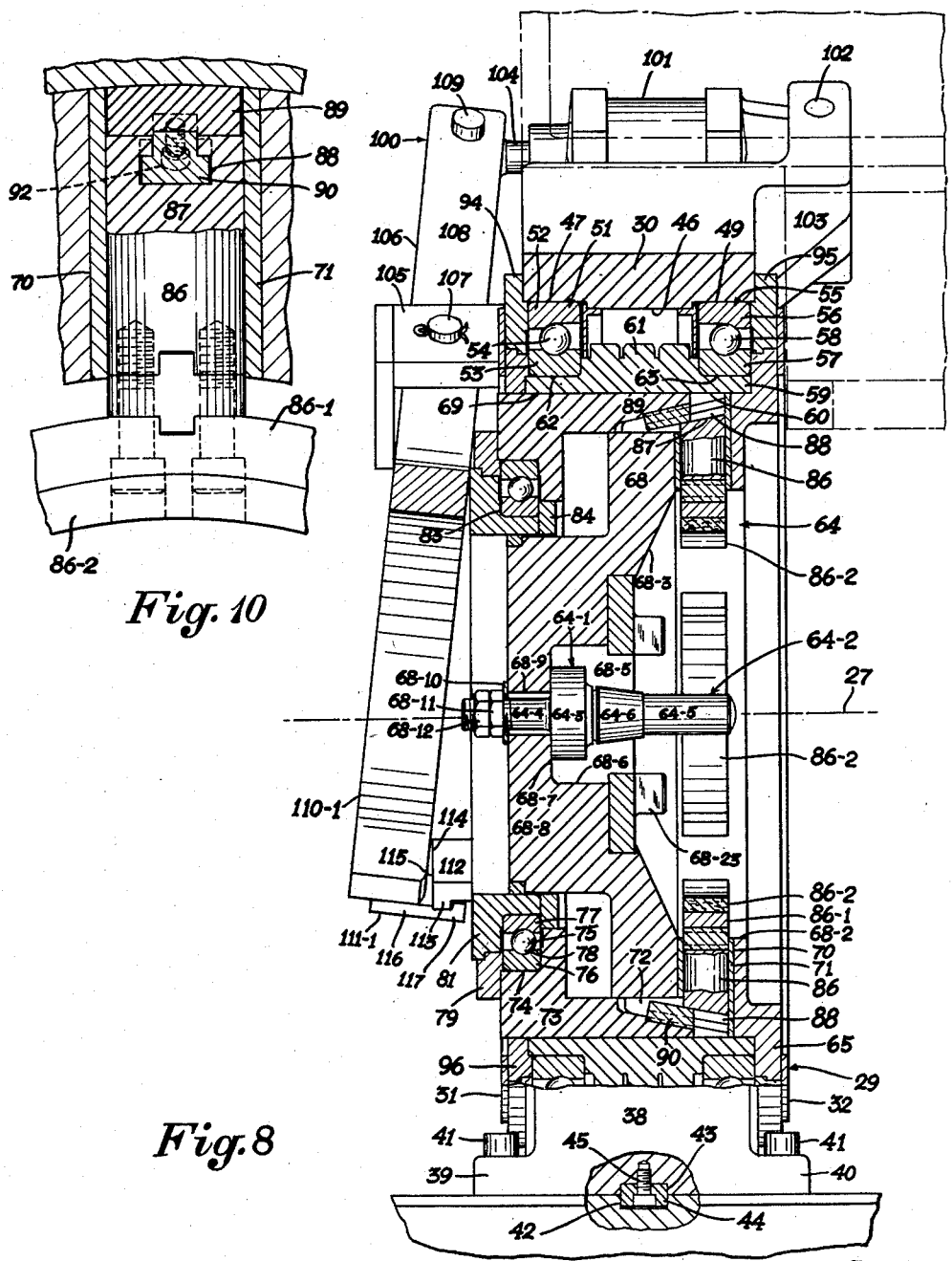

Inventor
STANFORD OVSHINSKY
By Frease, Bishop & Hamilton
Attorneys

Jan. 11, 1955 S. OVSHINSKY 2,699,084
MACHINE TOOL FOR MACHINING BRAKE DRUMS AND THE LIKE
Filed May 29, 1951 13 Sheets-Sheet 7

Inventor
STANFORD OVSHINSKY
Frease, Bishop & Hamilton
Attorneys

Jan. 11, 1955     S. OVSHINSKY     2,699,084
MACHINE TOOL FOR MACHINING BRAKE DRUMS AND THE LIKE
Filed May 29, 1951     13 Sheets-Sheet 12

INVENTOR.
STANFORD OVSHINSKY
BY
Frease, Bishop & Hamilton

United States Patent Office 2,699,084
Patented Jan. 11, 1955

2,699,084

MACHINE TOOL FOR MACHINING BRAKE DRUMS AND THE LIKE

Stanford Ovshinsky, New Britain, Conn., assignor to The Stanford-Roberts Manufacturing Company, Akron, Ohio, a corporation of Ohio Application May 29, 1951, Serial No. 228,871

13 Claims. (Cl. 82—40)

This invention or discovery relates in general to machine tools for machining brake drums and the like, and more particularly to such a machine tool adapted for automatic operation and for the machining of brake drums for automobile wheels.

A usual construction for such a brake drum consists of a cast iron brake cylinder containing an inner machined cylindrical bore constituting the braking surface. One end of the brake cylinder is connected with the outer periphery of a formed sheet steel annular disc. In final assembly the inner periphery of the brake drum disc is connected with the flange of the wheel hub, the flange being located intermediate the ends of a cylindrical hub sleeve portion having counterbored recesses at each end for receiving tapered roller bearing cups. The annular disc connecting the brake cylinder with the hub is secured to the hub flange by means of rivet studs, the rivet shanks of which extend through holes in the brake drum disc and through registering holes in the hub flange. The stud bodies are threaded for removable connection thereof with an automobile wheel having a disc with holes through which the threaded stud bodies extend, and nuts are screwed on the threaded stud bodies and clamp the wheel disc against the hub flange.

The cast iron for the brake drum cylinder is of a dense grade which in conjunction with the blow holes found in the rough castings produces a very abrasive action on the tools used to machine the bore of the brake drum cylinder. Moreover, the cast iron cylinder and connected disc both before and after connection of the disc with the hub constitute an inherently unstable workpiece.

It has been the usual practice in the production of brake drums for automobile wheels of the construction above described to rough bore on one machine the cast iron cylinder with the disc connected thereto, and without the hub attached. After the rough boring operation, the hub is attached to the disc with the bearing cups pressed into place. The cylinder is then semifinished bored on another machine, after which in most instances the workpiece is placed in a honing machine for the final finish bore operation on the cast iron cylinder of the brake drum. The top surface speed on the machined portions of the cast iron cylinder of the brake drum has been approximately 400 surface feet per minute.

The objects of the present invention or discovery include the provision of an improved machine tool for machining brake drums and the like, and particularly brake drums of the above described construction, and which is adapted to machine a workpiece including a cast iron brake cylinder, a disc, and a hub as above described so that all the machining operations on the brake cylinder are performed after a single chucking of the workpiece in the improved machine tool and at surface speeds sufficiently high to produce a finish on the inner cylindrical bore of the brake cylinder to avoid the necessity of a honing operation, the improved machine tool being adapted for semi-automatic operation whereby, after the chucking of a workpiece therein by the operator, a cycle of semi-automatic operations is performed on the workpiece including all of the necessary machining on the cast iron brake cylinder, the machine stopping at the end of the automatic cycle of operations for permitting unloading of the finished workpiece by the operator, and reloading of a new workpiece.

Further objects of the present invention or discovery include the provisions of such a machine tool in which are combined together for such semi-automatic operation a plurality of component mechanisms or sub-assemblies in certain of which are included improved details of construction and operation.

The foregoing and other objects are attained by the machine tool constructions, apparatus, improvements, parts, combinations, and sub-combinations which comprise the present invention or discovery, the nature of which is set forth in the following general statement, and preferred embodiments of which together with their mode of use are set forth by way of example in the following description, and which are particularly and distinctly pointed out and set forth in the appended claims forming part hereof.

The nature of the improved machine tool of the present invention or discovery may be stated in general terms as including an arbor and chucking apparatus preferably of the center drive type, the arbor and chucking apparatus including a rotary body from which extends a cantilever arbor and which also mounts rotatable chuck jaws adapted for chucking and releasing the workpiece. The machine tool also includes a tool slide movable towards and away from the rotary body and which includes a telescoping arbor adapted to engage the cantilever arbor, and which provides a rotary mounting for the workpiece.

By way of example, preferred embodiments of the machine tool of the present invention or discovery and of component mechanisms, sub-combinations, and parts thereof are illustrated in the accompanying drawings forming part hereof, in which:

Figure 1 is a front elevational view showing a preferred embodiment of the machine tool of the present invention or discovery, certain of the hydraulic and electrical parts thereof not being shown as is the case in other following views;

Fig. 2 is an axial sectional view showing a workpiece constituting a brake drum and hub assembly and which is particularly adapted to be chucked in the improved machine tool of Fig. 1 and have all of the necessary machining operations performed on its brake cylinder portion by an automatic cycle of operations;

Fig. 6 is an enlarged fragmentary view looking in the direction of the arrows 6—6, Fig. 3 showing the other or left end of the improved arbor chucking unit shown in Fig. 5;

Fig. 7 is a fragmentary oblique elevational view thereof looking in the direction of the arrows 7—7, Fig. 6;

Figure 3:
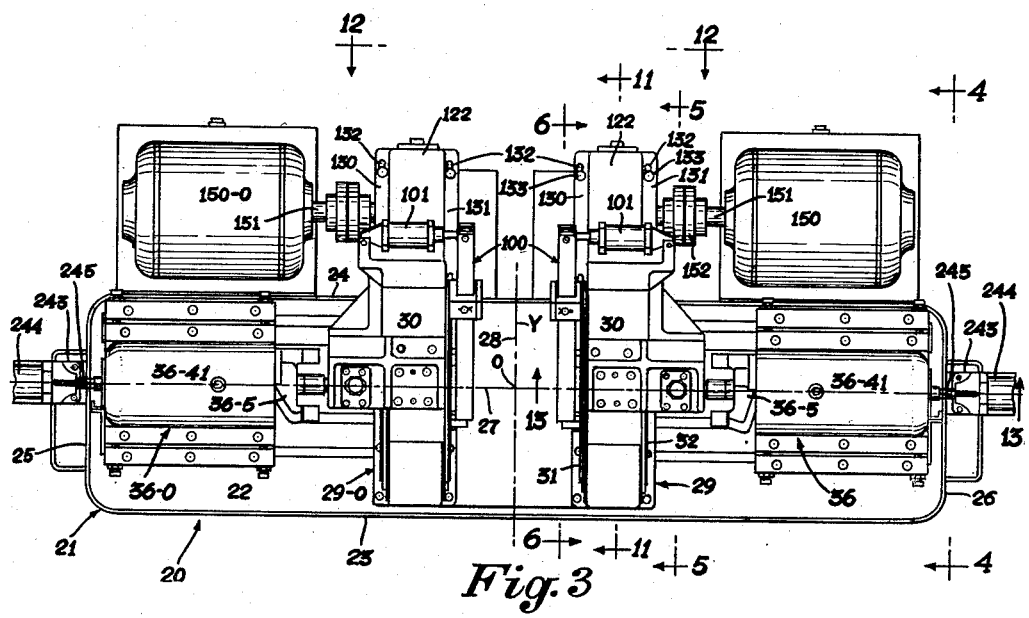
Fig. 3 is a top plan view of the improved machine tool of Fig. 1.
Figure 4:
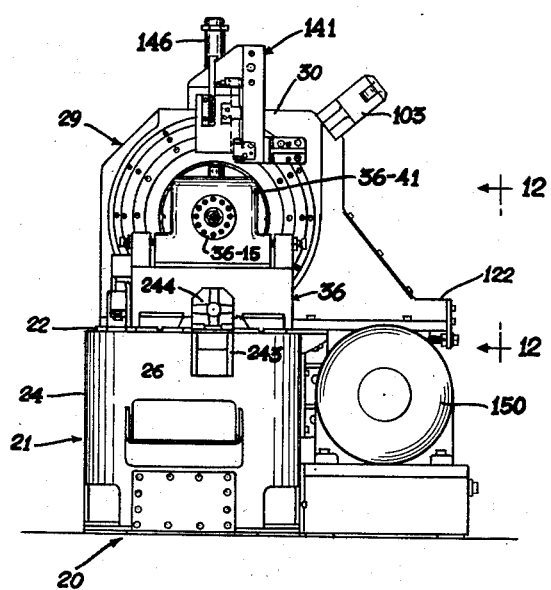
Fig. 4 is an elevational view of one end herein termed the right end of the improved machine tool hereof looking in the direction of the arrows 4—4, Fig. 3.
Figure 5:
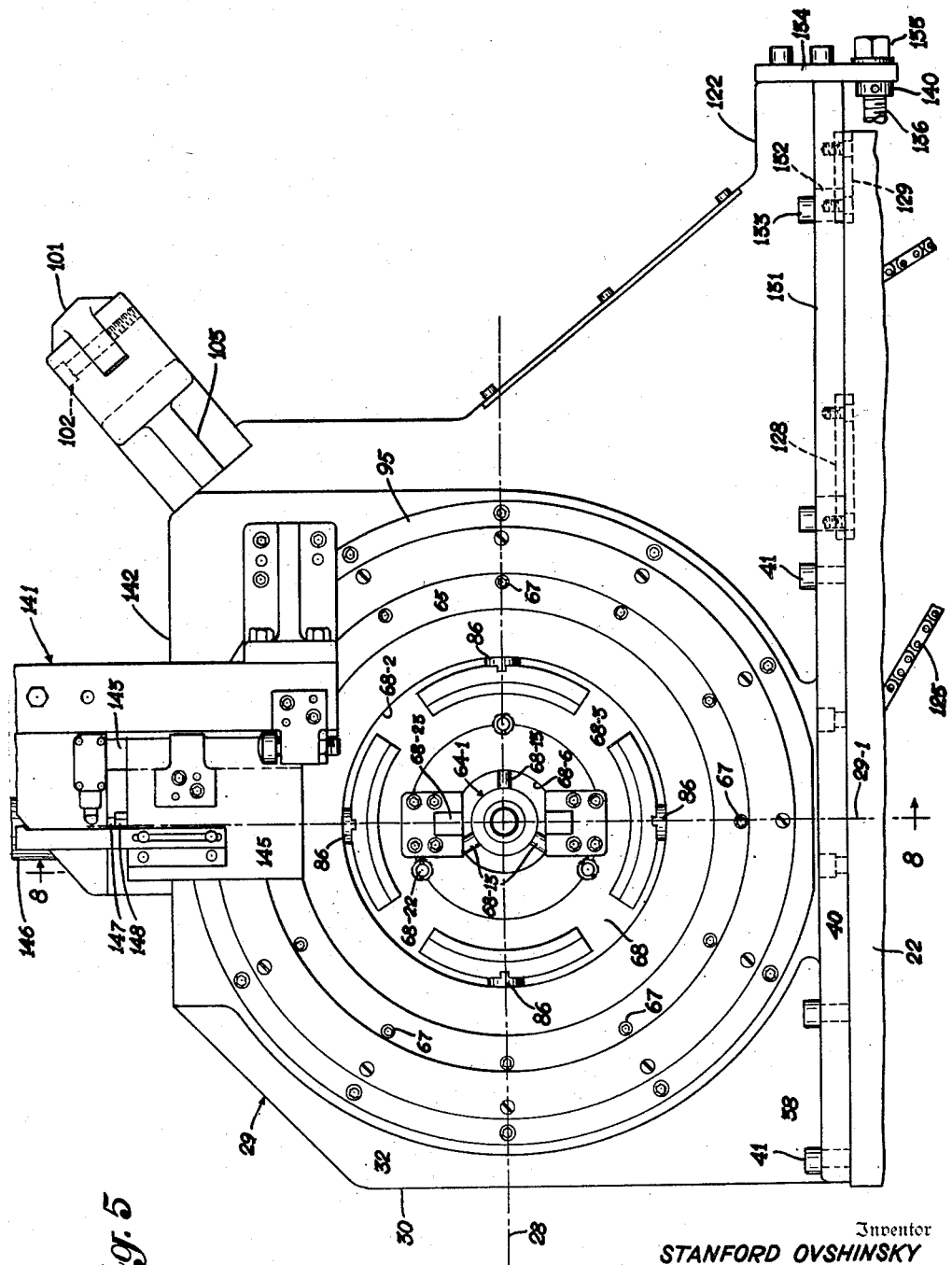
Fig. 5 is an enlarged fragmentary view looking in the direction of the arrows 5—5, Fig. 3, and showing the right end of one of the improved arbor chucking units of the improved machine tool hereof, which arbor chucking unit is herein termed the right arbor chucking unit and is located at the side of the machine tool herein termed the right side.
Figure 9:
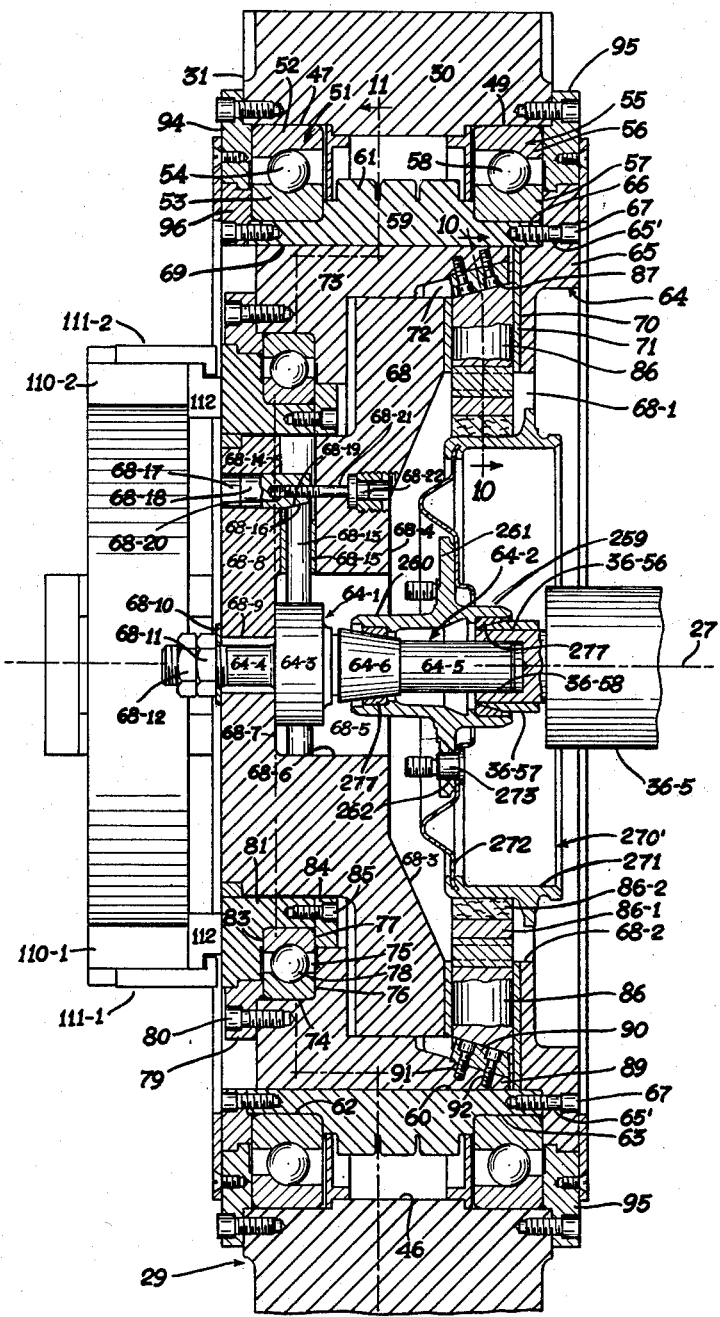
Figure 11:
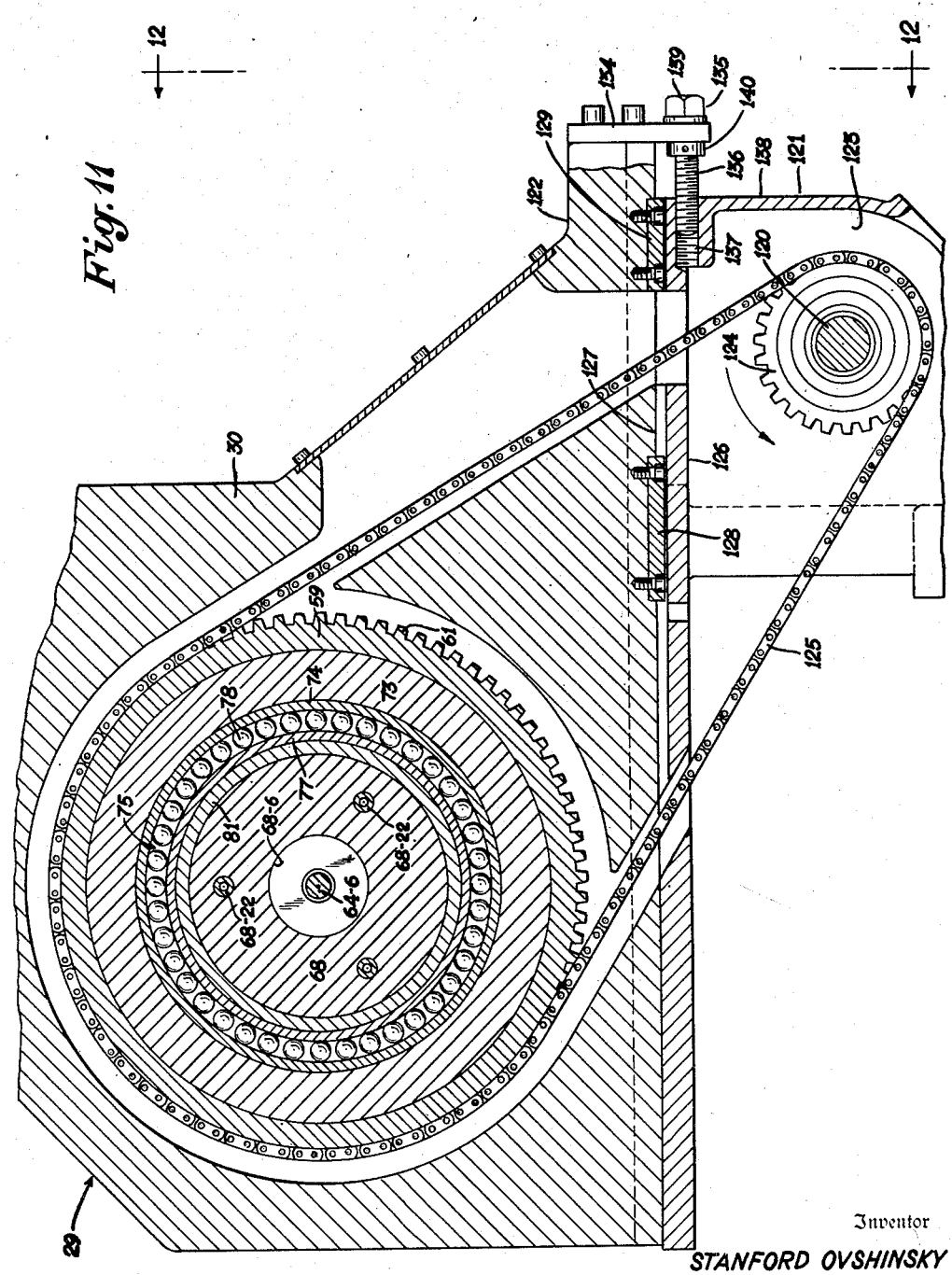
Figure 12:
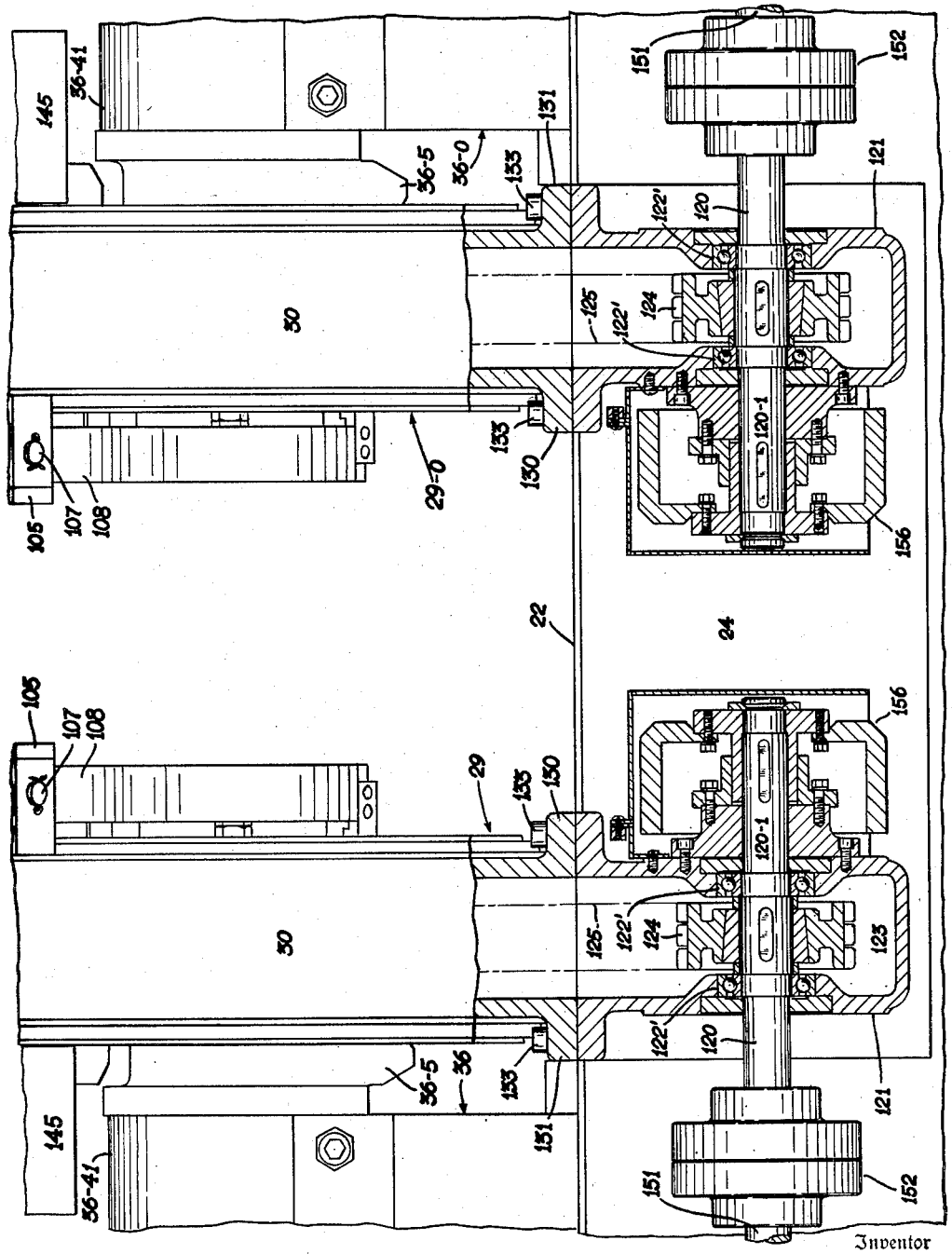
Figure 13:
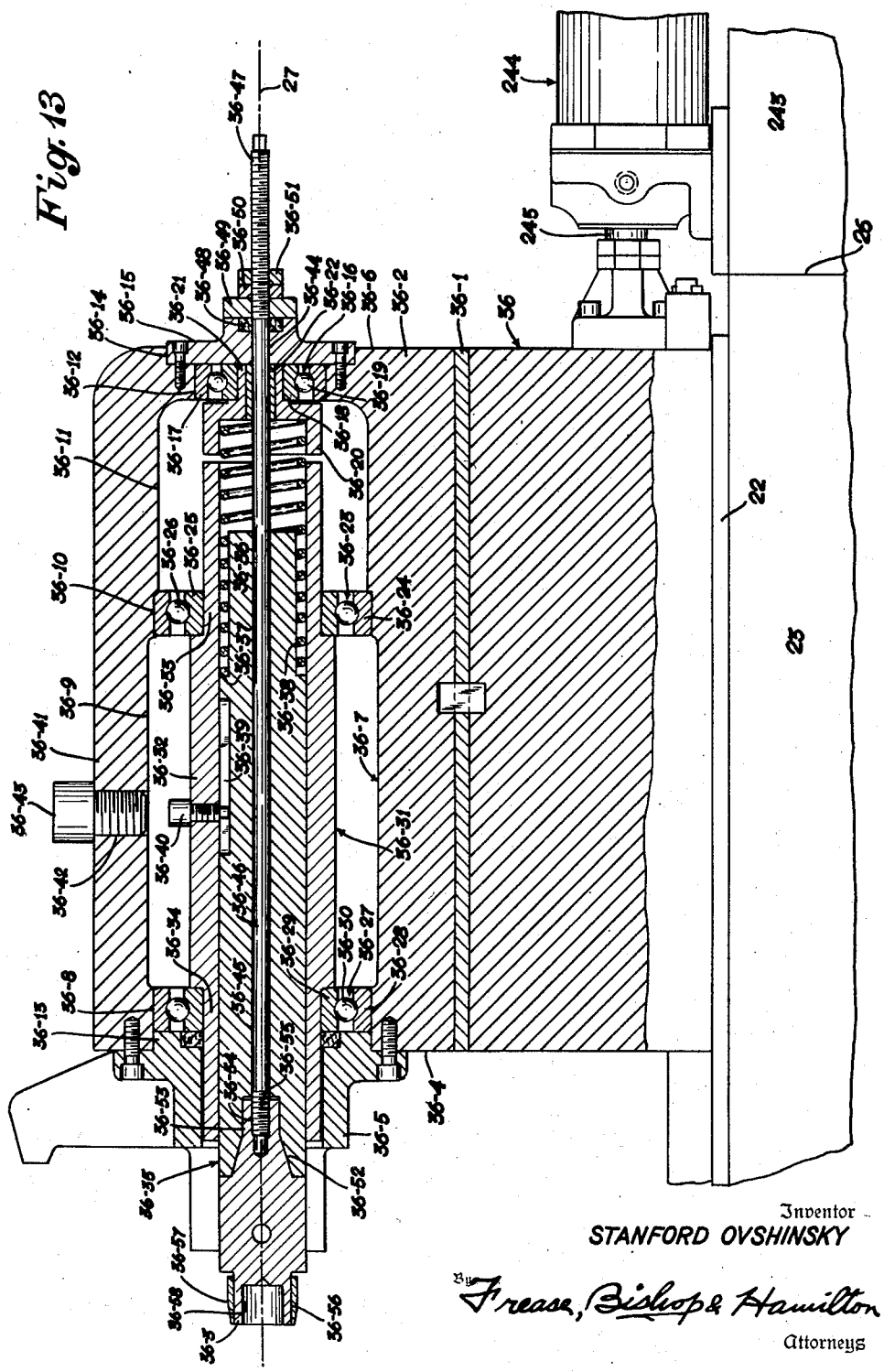
Figure 14:
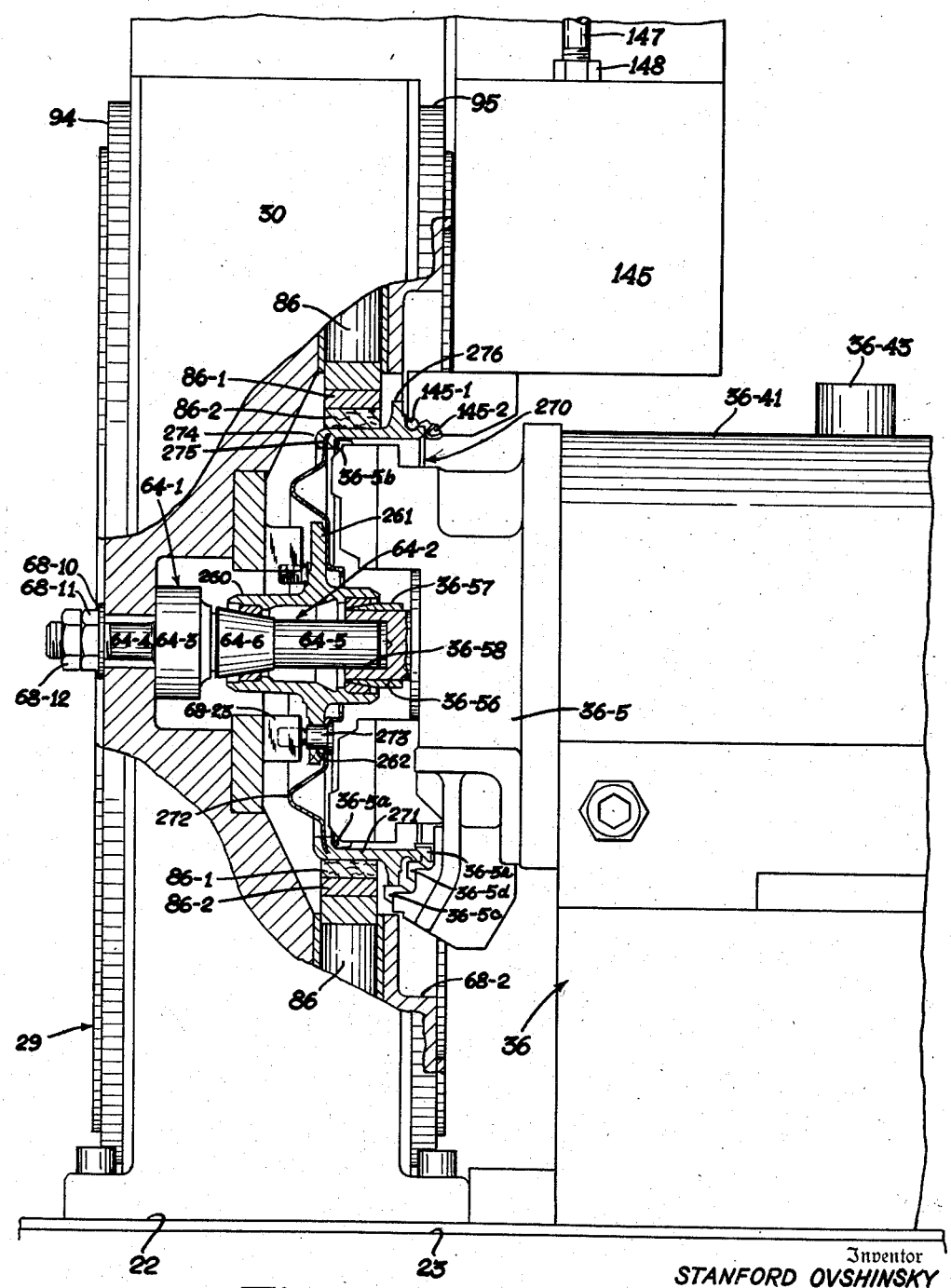
Figure 15:
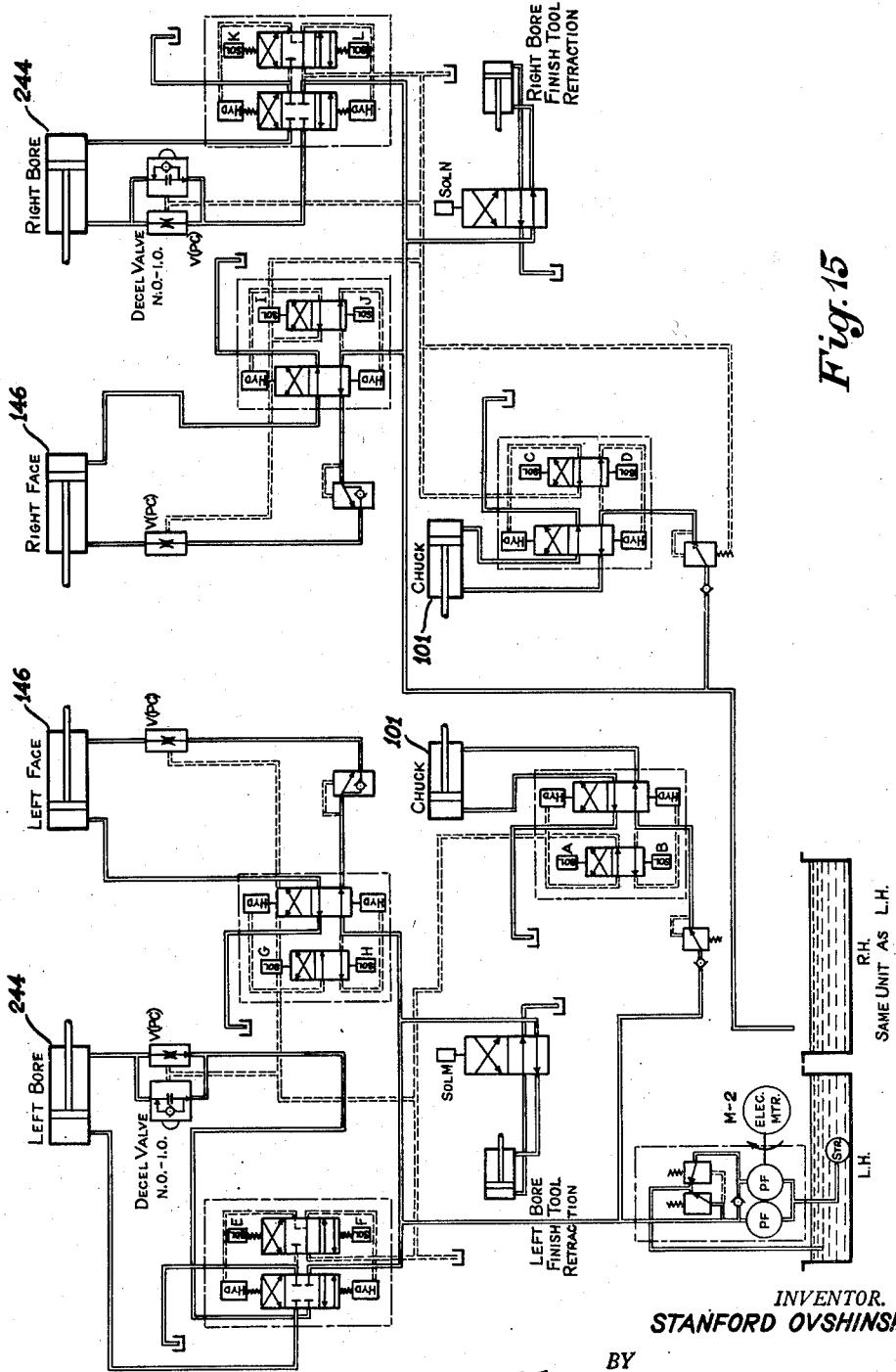
Figure 16:
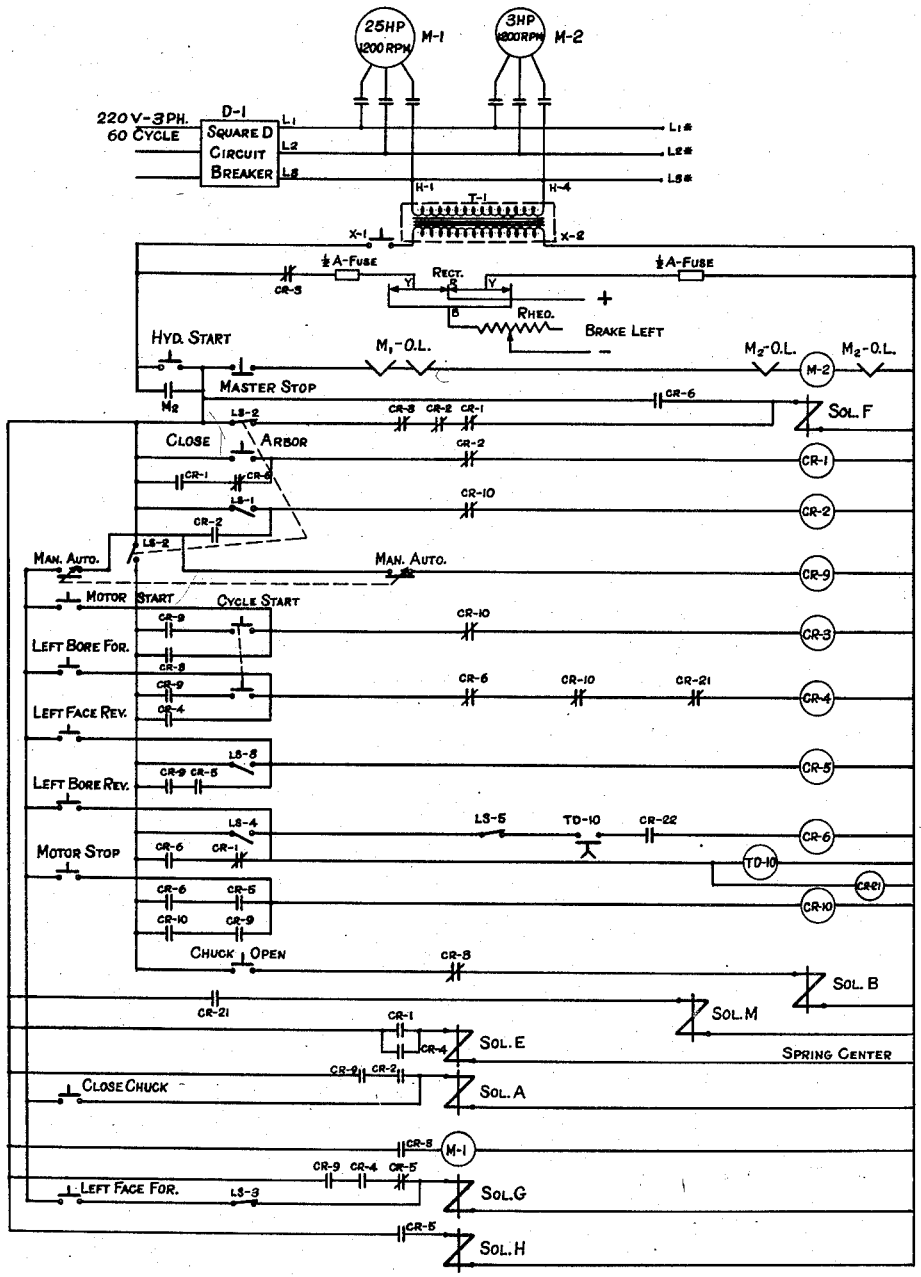
Figure 17:
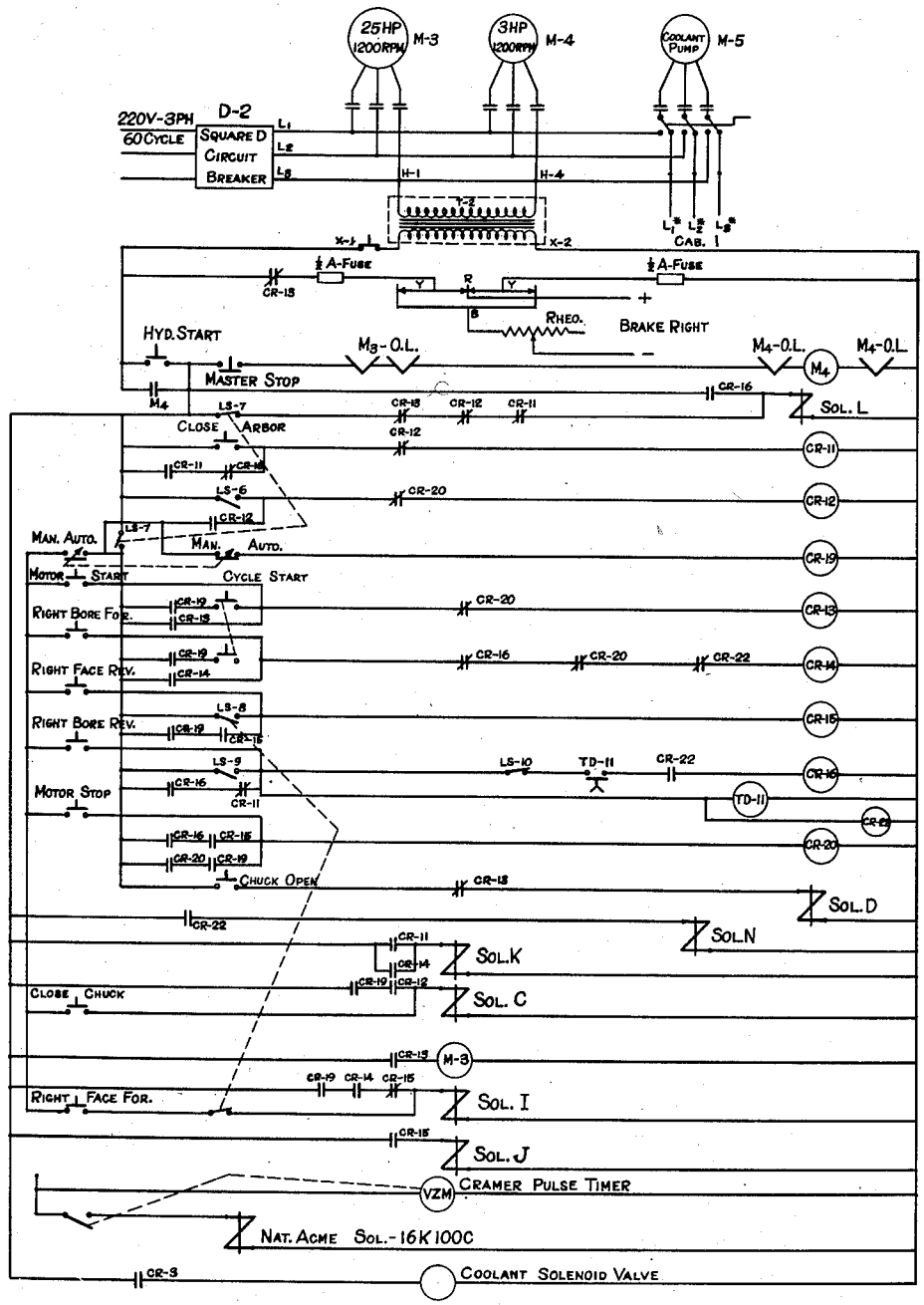

Fig. 8 is an enlarged fragmentary vertical sectional view of the improved arbor chucking unit shown in Figs. 5 and 6 as on line 8—8 of each of said views certain portions being removed, and the parts of the improved arbor chucking unit being shown with the chuck jaws in retracted position, and the line 8—8 being in a plane passing through the axis of rotation of the rotary parts of the arbor chucking unit;

Fig. 9 is a view similar to Fig. 8 showing a workpiece mounted in the improved arbor chucking unit, the section being taken on line 9—9, Fig. 6;

Fig. 10 is an enlarged fragmentary transverse sectional view thereof as on line 10—10, Fig. 9;

Fig. 11 is an enlarged fragmentary transverse sectional view as on line 11—11, Figs. 3 and 9, showing details of the drive means for the improved arbor chucking unit of the previous views, Figs. 5 through 10, inclusive;

Fig. 12 is an enlarged fragmentary rear elevational view looking in the direction of the arrows 12—12, Figs. 3, 4, and 11 showing details of the drive means for each of the two improved arbor chucking units incorporated in the improved machine tool hereof;

Fig. 13 is an enlarged fragmentary front elevational view with portions shown in section as on line 13—13, Fig. 3 showing details of construction of the improved slide unit of the improved machine tool at the right side of the machine tool;

Fig. 14 is an enlarged fragmentary front elevational view with portions shown in section showing a workpiece mounted in the improved arbor chucking unit at the right side of the improved machine tool and the several tools working thereon;

Fig. 15 is a diagrammatic view showing the layout of the hydraulic equipment incorporated in and associated with the improved machine tool hereof;

Fig. 16 is a diagrammatic view showing the layout of electrical equipment incorporated in and associated with the arbor chucking unit, the slide, and other parts at the left side of the improved machine tool hereof; and Fig. 17 is a similar diagrammatic view showing the layout of the electrical equipment incorporated in and associated with the arbor chucking unit, tool slide and other parts at the right side of the improved machine tool hereof.

Similar numerals refer to similar parts throughout the several views.

One embodiment of the improved machine tool of the present invention or discovery is indicated generally by 20, and referring more particularly to Figs. 1, 3 and 4, the machine tool 20 includes a base indicated generally by 21 which is generally in the form of an elongated rectangular box of arc-welded steel plate construction and includes an upper horizontal bed plate or wall 22, a front side wall 23, a back side wall 24, and end walls 25 and 26. The front and back side walls 23 and 24 join with the top wall 22 at top side corners, the end walls 25 and 26 join with the top wall 22 at top end corners, and the side walls 23 and 24 and the end walls 25 and 26 join with each other at rounded vertical end corners.

The improved machine tool 20 as illustrated is of substantial size, and of massive construction. The base 21 mounts high-speed operating units hereinafter described in detail.

Prior to the present improvements, in a machine tool of massive construction and mounting high-speed operating units, it has been considered that the base should be made of cast iron or cast steel in order to be sufficiently strong and rigid to mount the high-speed operating units without undesired vibrations being set up during use of the machine tool. In the improved machine tool 20, however, by the nature of the construction and arrangement of the operating units mounted on the base 21, as hereinafter set forth in detail, it has been found that the base 21, when made of arc-welded steel plate construction, is adequately strong and rigid for mounting the high-speed operating units so that undesired vibrations are not set up during use of the improved machine tool 20.

The operator of the improved machine tool 20 faces the front side wall 23 of the base, and the base end wall 25 is thus at the left of the operator and the base end wall 26 is at the right of the operator. For convenience in description, the base end wall 25 may be said to be at the left end of the machine tool 20, and the base end wall 26 may be said to be at the right end of the machine tool 20.

The base 21 of the machine tool 20 is elongated, and a longitudinally extending horizontal axis parallel with the side walls 23 and 24 is indicated by the dot-dash line 27 in Figs. 1 and 3, and a vertical plane Y intermediate the base end walls 25 and 26 and extending transversely of and perpendicular to the axis 27 is determined by the dot-dash axis lines 28 and 28-1, which are perpendicular to each other and to the axis 27, the axes 27, 28, and 28-1 intersecting each other at center O.

An improved automatic rotary arbor chuck unit indicated generally by 29 is mounted upon and extends upwardly from the bed plate 22 of the base 21 of the right side of plane Y. The improved automatic rotary arbor chuck unit 29 includes parts generally of the type set forth in my prior applications for United States Letters Patent, Serial No. 52,719 and Serial No. 209,453, and includes improvements thereon hereinafter set forth in detail, and includes rotary parts whose axis of rotation coincides with the axis 27 spaced above and parallel with the bed plate 22. The rotary and other operating parts of the chuck unit 29 are mounted in a housing 30 extending transversely of the base 21 and having a left end face 31 and a right end face 32 longitudinally spaced from and parallel with each other and with the transverse intermediate plane Y.

The improved automatic rotary chuck unit 29 is best shown in Figs. 5 to 10, inclusive, and the chuck unit 29 includes as above stated the housing 30, which is of massive cast iron construction and includes at its lower end 38 transversely extending flange portions 39 and 40 protruding outwardly respectively from the left end and right end faces 31 and 32 of the housing 30. The flanges 39 and 40 have a plurality of apertures formed therein which receive the threaded shanks of cap screws 41 which are screwed into threaded apertures in the bed plate 22.

Preferably as shown in Fig. 8, the top face of the bed plate 22 has formed therein a rectangular keyway 42 and the bottom face of the housing 30 has formed therein a rectangular keyway 43, the keyways 42 and 43 extending transversely and opening toward each other, and there being a key 44 fitting in the keyway 43 and secured to the lower end 38 of the housing 30 by countersunk cap screws 45, the key 44 protruding into and fitting in the keyway 42.

The housing 30 has formed therein a bore 46 which is coaxial with the axis 27 and which has a diameter of substantial magnitude, whereby the inner volume of the bore 46 is sufficient to accommodate the parts operatively mounted therein and to provide an opening for the chuck which is sufficiently large to permit mounting a brake drum and hub workpiece inside the chuck opening.

The chuck housing bore 46 has formed in its left end an inner bearing seat counterbore 47. Similarly, the chuck housing bore 46 has formed in its right end an inner bearing seat counterbore 49. A ball radial bearing indicated generally by 51 includes an outer raceway ring 52 seated in the left end counterbore 47, an inner raceway ring 53, and balls 54 interposed and rolling between the raceway rings 52 and 53 in a usual manner. Similarly, a ball radial bearing indicated generally by 55 includes an outer raceway ring 56 seated in the right end counterbore 49, an inner raceway ring 57, and balls 58 interposed and rolling between the raceway rings 56 and 57 in a usual manner.

A sprocket sleeve 59 is located in the bore 46 and has an inner bore 60 and outer sprocket teeth 61 which are coaxial with the axis 27, and the sprocket sleeve 59 has an outer left end bearing seat 62 seated in the inner raceway ring 53 of the left end bearing 51. Similarly, the sprocket sleeve 59 has a right end bearing seat 63 seated in the inner raceway ring 57 of the right end bearing 55, whereby the sprocket sleeve 59 is mounted for rotation about the axis 27 in the clutch housing 30.

An arbor mounting and clutch jaw guide member indicated generally by 64 is located in the bore of the sprocket sleeve 59 and includes at its right end an outer radially outwardly extending securing flange 65 having a plurality of counterbored apertures 65' formed therein and extending over the right end of the sprocket sleeve 59, the apertures in the flange 65 registering with threaded sockets 66 in the right end of the sprocket sleeve 59. Each aperture 65' registers with one of the sockets 66, and a cap screw 67 has its threaded shank extending through the aperture 65' and screwed into the socket 66 in each set of registering apertures 65' and socket 66, whereby rotation of the sprocket sleeve 59 rotates the arbor mounting and jaw guide member 64 through the drive connections of the cap screws 67.

The arbor mounting and clutch jaw guide member 64 furthermore includes an inner body portion 68 extending from the left end face of the mounting and guide member 64 through the bore of the sprocket sleeve 59. The body portion 68 is internally and externally cylindrically stepped, and forms with the bore of the sprocket sleeve 59 an annular pocket 69 opening to the left.

The annular clutch jaw guide member 64 furthermore has formed therein a plurality of radially extending jaw guide bores 70, which are four in number as shown. In each jaw guide bore 70 there is fitted a bushing 71. At the outer end of each jaw guide bore 70 the mounting and guide member 64 has formed therein an outwardly opening slot 72 having a bottom which slopes from the right end of the member 64 towards the left end and towards the axis 27.

The improved chuck unit 29 furthermore includes a jaw moving sleeve 73 having an outer cylindrical surface slidably fitting in the bore 60 of the sprocket sleeve 59. The jaw moving sleeve 73 has formed in its left end a bearing seat counterbore 74. A rolling thrust bearing indicated generally by 75 includes an outer raceway ring 76 seated in the counterbore 74, an inner raceway ring 77 and balls 78 interposed and rolling between the raceway rings 76 and 77 in a usual manner. A thrust bearing retainer ring 79 is removably secured as by countersunk screws 80 on the left end of the sleeve 73 and in abutment with the left end of the thrust bearing outer raceway ring 76.

A non-rotating thrust and bearing mounting sleeve 81 is located with clearance on the outer cylindrical end portion 64–1 of the mounting and guide member 64. At the right end of the sleeve 81 there is formed a shouldered cylindrical bearing seat 83, on which is seated the inner raceway ring 77 of the ball thrust bearing 75 and on the right end face of the sleeve 81 there is secured a bearing retainer ring 84 as by countersunk cap screws 85. The left end of the sleeve 81 as shown is in the form of an outwardly extending cylindrically stepped flange which mates with clearance with inner cylindrical stepped faces of the outer thrust bearing retainer ring 79.

In the bore of each jaw bushing 71 there is slidably fitted a cylindrical chuck jaw 86 having a sloping outer end 87 in which is formed a sloping T-slot 88 as best shown in Fig. 10. The slope of the outer end 87 and the T-slot 88 of each chuck jaw 86 is from the right end of the chuck housing towards the axis 27 and the left end of the chuck housing. At the right end of the jaw moving sleeve 73 there is provided for each chuck jaw 86 a longitudinally extending tongue 89 which extends into the notch 72 of the jaw guide bore 70 for the particular jaw 86, the tongue 89 extending over the outer sloping end of the jaw 86 and the T-slot 88 therein. Each tongue 89 has an inner slope coinciding and in abutment with the outer slope of its overlapped chuck jaw 86, and a T-shaped jaw return block 90 slidably fits in the T-slot 88 of each chuck jaw 86 and is secured as by cap screws 91 and 92 to the overlapping tongue 89. Accordingly, reciprocation of the sleeve 73 in the direction of the axis 27 effects inward and outward movements of the chuck jaws 86.

On the left end face 31 and in the left bearing seat counterbore 47 of the housing 30 there is removably secured a left bearing take-up ring 94 which abuts against the right end of the outer raceway ring 52 of the right ball radial bearing 51. Similarly, on the right end face and in the right bearing seat counterbore 49 of the housing 30 there is removably secured a right bearing take-up ring 95 abutting the right end of the outer raceway ring 57 of the right ball radial bearing 55. On the left end of the sprocket sleeve 59 there is removably secured an inner bearing retainer ring 96, having a right end face abutting and retaining the left end of the inner raceway ring 53 of the left bearing 51. The flange 65 of the jaw guide member 64 extends radially beyond the outer cylindrical surface of the right end bearing seat 63, and the flange 65 has a left end face abutting and retaining the right end of the inner raceway ring 57 of the right ball radial bearing 55.

Power means indicated generally by 100 are provided for applying pressure upon or reciprocating the non-rotating thrust sleeve 81, and thereby applying pressure upon or reciprocating the rotary chuck moving sleeve 73. As shown, the power means 100 includes a reciprocating motor 101 having at its right end a pivotal connection 102 with a mounting block 103 on the right end face 32 of the housing 30. The motor 101 includes a power-operated reciprocating rod 104 extending beyond the left end face 31 of the housing 30.

Intermediate the housing bore 46 and the rod 104, there is secured on the left end face 31 of the housing 30 a pivot block 105, and a yoke lever 106 has a pivot mounting 107 on the pivot block 105 and includes an outer arm 108 extending away from the bore 46 and having a pivotal connection 109 with the rod 104. The yoke lever 106 furthermore includes spaced yoke arms 110–1 and 110–2 extending crosswise of the outer end face of the thrust sleeve 81 at opposite sides of the axis 27. The yoke arm 110–1 has a push and pull connection 111–1 with the thrust sleeve 81, and the yoke arm 110–2 has a push and pull connection 111–2 with the thrust sleeve 81. The push and pull connections 111–1 and 111–2 are similar, and each includes a push and pull block 112 secured to the outer or left end of the thrust sleeve 81 and including a radially extending pull flange 113 at its outer end and an outer thrust end face 114. The outer end of the yoke arm 110–1 has on its inner or right face a curved portion 115 abutting the thrust face 114 of the block 112. A pull hook 116 is secured on the outer end of the yoke arm 110–1 and includes a hook end 117 which is hooked beneath the flange 113. Accordingly, when the rod 104 is urged outwardly away from the left end face 31 of the housing 30, thrust is applied by the yoke arms 110–1 and 110–2 on the diametrically opposite blocks 112 mounted on the thrust sleeve 81 serving to push or urge the thrust jaws 86 radially inwardly. Reverse movement of the rod 104 pulls the thrust jaws 86 radially outwardly.

The push and pull connection 111–1 and 111–2, as above described, also hold the thrust sleeve 81 against rotation.

As best shown in Figs. 11, 12, and 13, the rotary drive for the chuck unit 29 is of improved construction and includes a drive shaft 120 located at the rear of the rear side wall 24 of the base 21 and below the top bed plate 22. A housing 121 is suspended from a rear extension 122 of the chuck housing 30 at the rear of the base rear side wall 24. The axis of the shaft 120 is parallel with the chuck axis of rotation 27, and the shaft 120 extends through end openings in the housing 121 and is rotatably mounted therein by longitudinally spaced ball bearings 122′. In the compartment 123 of the housing 121 there is keyed upon the shaft 120 a drive sprocket 124, and an endless chain belt 125 extends around and fits on the teeth of the drive sprocket 124 and the teeth of the sprocket sleeve 59 of the chuck. The housing 121 includes an upper wall 126 having formed therein an upwardly opening keyway 127 which extends in the direction of the axis 28, and keys 128 and 129 depend from the bottom of the chuck housing extension 122 and fit in the keyway 127.

The chuck housing extension 122 includes at its bottom longitudinally spaced transversely extending flanges 130 and 131, as best shown in Fig. 3. The flanges 130 and 131 have formed therein elongated slots 132 through each of which extends the shank of a cap screw 133 the threaded end of which is screwed into the top wall 126 of the housing 121 whereby the housing 121 and the shaft 120 and sprocket 124 are movable towards and away from the vertical plane including the chuck axis of rotation 27 for adjusting the tension on the chain belt 125.

Means are provided for locking the housing 121 at any desired adjusted transverse position, which as best shown in Fig. 11 includes a set screw journalling bar 134 depending from the rear end face of the chuck housing extension 122, and a set screw 135 is journalled in the lower end of the bar 134, and the threaded shank 136 of the set screw is screwed into a threaded bore 137 extending transversely in the rear wall 138 of the housing 121. The set screw 135 has a head 139 on the outside of the bar 134 and a collar 140 is located and secured on the shank 136 of the set screw 135 in abutment with the inside face of the bar 134, whereby rotation of the set screw 135 serves to move the housing 121 transversely of the chuck housing 30 when the cap screws 133 are loosened.

As shown in Figs. 3 and 12, a main drive motor 150 includes a shaft 151 aligned with one end of the shaft 120 beyond one side of the housing 121, and the shaft 151 has a connection with the shaft 120 by means of a coupling 152. The shaft 120 has another end 120–1 extending beyond the other side of the housing 121, and there is keyed on the shaft end 120–1 a brake drum 156, which is associated with an electrically actuated band brake mechanism not shown.

As best shown in Fig. 5, the improved machine tool 20 furthermore includes a vertical slideway and motor mounting bracket indicated generally by 141 which is secured on the horizontal top face 142 of the chuck housing 30. The bracket 141 includes vertical dovetail guideways 143 extending downwardly towards the chuck opening 144 and crosswise of the chuck housing right end face 32. A tool holder block 145 is vertically slidable on the ways 143 in the vertical plane including the vertical axis 28–1, and power means are provided for reciprocating the tool holder block 145, which as shown includes a reciprocating motor 146 mounted on the upper end of the bracket 141 and including a vertically reciprocating rod 147 having a connection 148 at its lower end with the upper end of the tool holder block 145.

The improved automatic rotary chuck unit 29, furthermore includes according to the present invention or discovery, improved adjustable arbor means indicated generally by 64–1 mounted on the inner body portion 68 of the arbor mounting and clutch jaw guide member 64. The arbor means 64–1 preferably as shown includes a cantilever arbor 64–2 formed intermediate its ends with an enlarged cylindrical flange 64–3, and with an externally threaded connecting end 64–4, and a workpiece mounting end 64–5, the connecting end being at one side of the flange 64–3, the left side as shown, and the mounting end being at the other side of the flange 64–3, the right side as shown.

As aforesaid, the body portion 68 of the mounting and guide member 64 is internally cylindrical stepped, and is formed at its right end with an enlarged cylindrical pocket 68–1 into which extend the inner ends of the chuck jaws 86. The pocket 68–1 is formed with a cylindrical side wall 68–2, and a bottom wall including an outer conical portion 68–3 and an annular bottom portion 68–4. At the left side of the pocket 68–1 the body portion 68 is formed with a cylindrical sub-pocket 68–5 having a cylindrical side wall 68–6 opening through the annular bottom portion 68–4 of the bottom wall of the pocket 68–1, and the sub-pocket 68–5 having a bottom wall 68–7.

The left end 68–8 of the body portion 68 of the mounting and guide member 64 is formed with a bore 68–9 which opens at its right end into the sub-pocket 68–5 and opens at its left end through the left end face of the body portion 68. The bore 68–9, the cylidrical side wall 68–6 and the cylindrical side wall 68–2 are all coaxial with each other one and with the axis 27.

The connecting end 64–4 of the arbor 64–2 is substantially of smaller diameter than the diameter of the bore 68–9, and the connecting end 64–4 extends through the bore 68–9 with the flange 64–3 located in the sub-pocket 68–5 and having its left end face abutting the bottom wall 68–7 of the sub-pocket 68–5. The connecting end 64–4 extends beyond the left end face of the body portion 68 and a washer 68–10 is located thereon in abutment with the left end face of the body portion 68, and a securing nut 68–11 and a jam nut 68–12 are screwed on the threaded connecting end 64–4, the nut 68–11 abutting the washer 68–10, and the jam nut 68–12 abutting the nut 68–11.

Arbor centering means are operative between the mounting and guide member body portion 68 and the arbor 64–2, and as shown the arbor centering means includes a plurality of extendable and retractable centering jaws each indicated by 68–13, and each of which is extendable and retractable in the body portion 68 in a direction radially of the axis 27, and each jaw 68–13 having an inner end abutting against the cylindrical outer surface of the arbor flange 64–3. Separate means are provided for extending and locking each centering jaw 68–13 against the flange 64–3.

As shown there are three jaws 68–13 located with their longitudinal axes in a common plane at right angles to the axis 27. For each jaw 68–13 there is formed in the body portion 68 a bore 68–14 having an inner end communicating with the sub-pocket 68–5 through the side walls 68–6. At the inner end of each bore 68–14 there is fitted a bearing sleeve 68–15, and one of the jaws 68–13 is slidably fitted in the bore of each sleeve 68–15.

The outer end of each jaw 68–13 is formed with a sloping end face 68–16, the slope of which is downwardly towards the axis 27 from right to left. The left end of the body portion 68 is formed with bores 68–17 each extending at right angles to one of the bores 68–14 and communicating therewith. In each bore 68–17 there is slidably fitted an adjusting cam 68–18 having a sloping inner face 68–19 which fits against the sloping face 68–16 of its associated jaw 68–13. The inner end of each cam 68–18 is also provided with an internally threaded bore 68–20, and the body portion 68 is formed with a counterbored opening 68–21 through which extends the inner threaded end of an adjusting screw 68–22 having an enlarged head seated in the counterbored outer end of the opening 68–21, and the counterbored outer end of the opening 68–21 being internally threaded and there being a lock screw operative against the enlarged head of the screw 68–22 and threaded and screwed in the threaded counterbore.

By these means each cam 68–18 may be moved lengthwise of its longitudinal axis so as to seat and clamp each centering jaw 68–13 at a desired position to center the arbor 64–1 so that its longitudinal axis coincides with the axis 27.

The arbor workpiece mounting end 64–5 is cylindrical at its outer portion and is provided with a conical seat portion 64–6 adjacent the flange 64–3 for fitting into the cup of a tapered roller bearing.

At each of opposite sides of the sub-pocket 68–5 there is secured in a depression formed in the body portion 68 a driving lug 68–23 extending into the pocket 68–1.

On the inner end of each of the chuck jaws 86 there is separately mounted a gripping segment 86–1 having an inner lining 86–2 which is made of material having a degree of resilience such as brake band material.

In addition to the improved automatic rotary arbor chuck unit 29 and other parts above described, the improved machine tool 20 includes, at the right of the plane Y and the right end face 32 of the chuck unit 29, a tool slide indicated generally by 36 and which is operatively mounted for longitudinal movement parallel with the axis 27 on the top of the bed plate 22. This mounting is effected preferably by means of inter-fitting longitudinally extending dovetail tongue and groove slide bearing sets.

On the right end wall 26 of the base 21 there is secured a mounting bracket 243, and a reciprocating motor indicated generally by 244 is mounted on the top of the mounting bracket 243 and includes a reciprocating rod 245 which extends from the left end of the motor 244, and moves in a direction parallel with the axis 27 and has a left outer end connected with the right end of the tool slide 36.

The tool slide 36 has a flat top on which is preferably positioned a flat fitting plate 36–1 and on top of the flat fitting plate 36–1 is positioned a housing 36–2 which with the plate 36–1 is laterally keyed to the slide 36. The housing 36–2 operatively mounts an arbor 36–3 for rotation and sliding in the direction of its longitudinal axis. The arbor 36–3 may be otherwise termed a tool slide arbor to distinguish it from the arbor 64–2 which may be otherwise termed a chuck arbor. The housing 36–2 has a left end face 36–4 on which is mounted a tool holder 36–5.

The housing 36–2 also includes a right end face 36–6 and is formed with a stepped cylindrical bore indicated generally by 36–7 and which extends through the housing from and through the left end face 36–4 to and through the right end face 36–6. The bore 36–7 includes a left end bearing seat portion 36–8, next an enlarged lubricating chamber portion 36–9, next a reduced and shouldered bearing seat portion 36–10, next a further reduced right end portion 36–11, and finally a further reduced bearing seat portion 36–12.

The tool holder 36–5 is formed with a right end plug portion 36–13 which fits in the outer end of the bearing seat bore portion 36–8 of the housing 36–2. At the right end of the housing 36–2 there is formed a counterbore 36–14 in which is seated a bearing retainer plate 36–15.

A ball thrust bearing indicated generally by 36–16 includes an outer raceway ring 36–17 fitting in the bore seat portion 36–12 of the housing 36–2, an inner raceway ring 36–18 and balls 36–19 interposed and rolling between raceway rings 36–17 and 36–18. Within the bore portion 36–11 of the housing 36–2 there is located a spring cup 36–20 opening towards the left and having a tubular bearing stem 36–21 extending to the right and fitting in the bore of the inner bearing raceway ring 36–18. The bore of the stem 36–21 extends through the bottom wall of the cup 36–20 and there is fitted therein a slide bearing sleeve 36–22.

A ball bearing 36–23 includes an outer raceway ring 36–24 seated in the shouldered bearing seat portion 36–10 of the bore of the housing 36–2, and the ball bearing 36–23 furthermore includes an inner raceway ring 36–25, and balls 36–26 are interposed and rolled between the inner and outer raceway rings 36–25 and 36–24. A companion ball bearing 36–27 includes an outer raceway ring 36–28 seated in the bearing seat portion 36–8 of the bore of the housing 36–2, an inner raceway ring 36–29, and balls 36–30 interposed and rolling between the raceway rings 36–28 and 36–29.

The bearings 36–16, 36–23, and 36–27 have a common axis of rotation which coincides with the axis 27 of the machine tool 20, and an arbor shaft mounting sleeve 36–31 includes a central enlarged portion 36–32, a reduced right end portion 36–33, and a reduced left end portion 36–34. The sleeve 36–31 extends into the bore 36–7 of the housing 36–2 from the left end thereof, and the bearing inner raceway ring 36–25 is seated on the sleeve reduced end portion 36–33 and abutted against the shoulder therebetween and the sleeve enlarged portion 36–32. The inner bearing raceway ring 36–29 is seated on the sleeve reduced end portion 36–34 and abutted against the shoulder therebetween and the enlarged sleeve portion 36–32.

An arbor shaft indicated generally by 36–35 is fitted in the bore of the sleeve 36–31 and includes a reduced right end portion 36–36 terminating in a shoulder 36–37. A helical spring 36–38 is located in the right end of the bore of the sleeve 36–31 and has its left end abutted against the shoulder 36–37 and its right end abutted against the bottom of the cup 36–20.

Means are provided for preventing rotation and permitting longitudinal sliding of the shaft 36–35 in the sleeve 36–31, and which as shown includes a longitudinally extending key slot 36–39 formed in the shaft 36–35 and a threaded guide pin 36–40 which has its inner tip end extending into the slot 36–39, a threaded intermediate shank portion screwed into a threaded aperture in the enlarged sleeve portion 36–32, and an enlarged head end.

There is preferably formed in the top 36–41 of the housing 36–2 a threaded access opening 36–42 into which is screwed a plug screw 36–43. The threaded guide pin 36–40 is alignable with the threaded access opening 36–42, whereby when the plug 36–43 is removed, the pin 36–40 may be unscrewed and withdrawn from the slot 36–39, and the shaft 36–35 may then be removed from the sleeve 36–31.

The plate 36–15 is provided with a bore 36–44 which is aligned with the bore of the bearing sleeve 36–22, and the arbor shaft 36–35 is formed with a bore 36–45 extending therethrough and aligned with the bore of the bearing sleeve 36–22 and the plate bore 36–44, all of which bores are of the same diameter. A tension retainer rod 36–46 extends through the shaft bore 36–45 and the bore of the bearing sleeve 36–22 and the plate bore 36–44, the right end portion 36–47 of the rod 36–46 being threaded.

Oil sealing means 36–48 are located on the outer face of the plate 36–15 and seal the rod 36–46. An annular spacer 36–49 is located on the threaded end 36–47 of the rod 36–46 against the outer face of the oil sealing means 36–48. A nut 36–50 is screwed on the rod threaded end 36–47 against the spacer 36–49 and a jam nut 36–51 is screwed on the threaded rod end 36–47 against the nut 36–50.

The left end of the shaft 36–31 is formed with a conical and cylindrically bottomed counterbored socket 36–52, and the right end of the arbor 36–3 is formed with a conical and cylindrically ended projection 36–53 which fits in the socket 36–52, and the projection 36–53 has formed therein a threaded socket 36–54. The left end 36–55 of the rod 36–46 is threaded and screwed into the threaded socket 36–54 of the arbor 36–3.

The arbor 36–3 has a reduced externally cylindrical left end 36–56 on which is secured an externally conical bearing cup supporting sleeve 36–57. The tool slide arbor end 36–56 is also provided with a counterbore 36–58 which is adapted to fit and receive the right end of the chuck arbor 64–2.

From a very broad standpoint, each of the reciprocating motors of the machine tool 20 might include a reciprocating rod actuated through a worm wheel and worm, or a rack and pinion gearing by a rotary electric motor. However, such a reciprocating motor would not be able to attain the more specific and ultimate objects of the present invention or discovery which include the high speed production of the finished brake cylinder portions of brake drums with attached hubs substantially free from tooling or chatter marks, and ready for use.

For the purpose of attaining such specific ultimate objects of the present invention or discovery, each of the reciprocating motors of the illustrated machine tool 20 is a double-acting fluid operated reciprocating motor including a cylinder in which a piston reciprocates between opposite cylinder heads, and the reciprocating rod of the motor extends through a seal opening in one of the cylinder heads and has an inner end connected with the piston.

The piston forms cylinder chambers in the cylinder between each of its faces and the opposite cylinder head, and fluid under pressure is alternately pumped into and out of the opposite cylinder chambers, thereby moving the piston and piston rod.

In such fluid operated reciprocating motors when the fluid is liquid such as oil or a mixture of oils and other liquids, the motors are used in systems which are known in industry as hydraulic systems, and standards have been adopted in industry which define such motors as cylinders. From the standpoint of industrial terminology when such a cylinder is operated by a liquid under pressure, it is known as a hydraulic cylinder, and when it is operated by air under pressure, it is known as an air cylinder.

In the illustrated machine tool 20, using the industrial terminology, each of the reciprocating motors is a hydraulic cylinder.

Fig. 15 is a diagrammatic view showing the layout of the hydraulic equipment incorporated and associated with the improved machine tool 20. The graphical symbols used in Fig. 15 are substantially those contained in the publication entitled "J. I. C. Hydraulic Standards for Industrial Equipment," published as of September 1948, after being compiled by the Joint Industry Conference.

Each of the hydraulic cylinders shown in Fig. 15 is given the general numerical reference character previously used herein. The solenoid actuators for the control valves for the cylinders are given alphabetical reference characters which conform to similar reference characters used in Figs. 16 and 17.

The improved machine tool 20 hereof both for manual and semi-automatic operation is provided, in addition to the motors heretofore indicated, with other motors, and with other electrical equipment including control equipment. The diagrammatic views Figs. 16 and 17 illustrate the layout of the electrical equipment incorporated in and associated with the improved machine tool 20, and the graphical symbols used in Figs. 16 and 17 are substantially those included in American Standard Graphical Symbols for Electric Power and Control, ASA Z 32.3, 1946, approved by American Standards Association, March 1, 1946.

It is specifically noted with respect to contacts that the character "NO" means normally opened for the normal position of the contacts, and the character "NC" means normally closed for the normal position of the contacts. Furthermore, it is noted that in the previous description of the mechanical association of the parts of the machine tool 20, the motors have been given numerical reference characters whereas in Figs. 16 and 17 for convenience the motors are given letter and number reference characters "M–1" etc. The following shows the identity of the motor reference characters of the diagrammatic views Fig. 16 and Fig. 17 and the numerical reference characters for the motors used in the mechanical description:

| Diagram Reference Character | Mechanical Description Reference Character |
|---|---|
| M–1 | 150 |
| M–3 | 150–0 |

The limit switches and the operations thereof in the improved machine tool 20 are set forth in the following table:

*Limit switches*

| Reference Character | Normal Position of Contacts | Operation |
| --- | --- | --- |
| LS-1 | NO—IO | Operated By Bore Slide Forward. |
| LS-2 | NC—IC | Operated By Chuck Close. |
| LS-3 | NO—IO | Operated By Face Slide Forward. |
| LS-4 | NO—IO | Operated By Bore Slide Forward—Complete. |
| LS-5 | NC—IC | Operated By Bore Slide Reverse. |
| LS-6 | NO—IO | Operated By Bore Slide Forward. |
| LS-7 | NC—IC | Operated By Chuck Close. |
| LS-8 | NO—IO | Operated By Face Slide Forward. |
| LS-9 | NO—IO | Operated By Bore Slide Forward—Complete. |
| LS-10 | NC—IC | Operated By Bore Slide Reverse. |

The tool holder 36–5 on the slide 36, which may be termed the bore slide, as shown in Fig. 14 mounts a boring tool 36–5a, a bottoming tool 36–5b, turning tools 36–5c and 36–5d, and a chamfering tool 36–5e.

The tool holder block 145, which may be otherwise termed a face slide, mounts at its lower end a grooving tool 145–1 and a facing tool 145–2.

Fig. 2 is a view of a finished brake drum indicated generally by 270 for which the improved machine tool 20 as shown is set up to machine, and the brake drum 270 includes a cast iron brake cylinder 271, a formed sheet steel annular disc 272, and a hub 259. The hub 259 includes a cylindrical sleeve portion 260 intermediate the ends of which is located a radially outwardly extending annular flange 261, and the annular flange 261 has formed therein a plurality of holes 262 equally spaced from each other, and the annular disc 272 has an inner peripheral border portion provided with holes registering with the flange holes of the hub 259. For each set of registering holes of the disc and the hub flange a rivet stud 273 has a shank extending through the registering holes and riveted to connect the disc and the hub together. The brake cylinder 271 is provided at one end 274 with an inwardly extending grooved flange 275 into the groove of which extends the outer peripheral border of the disc 272 and is secured therein.

Intermediate the ends of the brake cylinder 271 there is located an outwardly extending annular flange 275, and an annular groove 276 is formed in the outer surface of the cylinder 271 at the side of the flange 275 opposite the cylinder end 274. The cylinder 271 includes an inner cylindrical bore 277, the machining of which, together with other surfaces of the cylinder, is the function of the improved machine tool 20.

In Fig. 9 is shown an unfinished brake drum indicated by 270' and which includes the parts described for the finished brake drum 270. The unfinished brake drum 270' constitutes the workpiece and in a counterbored seat at each end of the hub sleeve 260 of the workpiece 270' there is seated a roller bearing cup 277. The brake cylinder 271 extends from one side of the disc 272, and the hub flange 261 is located on the other side of the disc 272.

In Fig. 9 the workpiece 270' is shown mounted in the improved arbor chuck unit 29. The roller bearing cup 277 in the end of the sleeve 260 on the opposite side of the disc 272 from the brake cylinder 271 is seated on the arbor conical seat portion 64–6, and the tool slide 36 has been advanced to a position at which the tool slide arbor end 36–56 has telescoped over the arbor workpiece mounting end 64–5, which extends into the counterbore 36–58, and the bearing cup supporting sleeve 36–57 fits into the bearing cup 277 at the brake cylinder side of the disc 272. Also, as shown in Fig. 9 the chuck jaws 86 have been extended so that the inner sectoral faces of the gripping segment linings 86–2 fit against the outer surface of the brake cylinder 271.

In Fig. 14 the workpiece 270' has become the finished brake drum 270, the tools on the tool holder 36–5 of the bore slide 36 and the tools on the face slide 145 being shown in their positions at the end of their respective machining operations.

Fig. 17 is a diagrammatic view showing the layout of the electric equipment incorporated in and associated with the improved machine tool hereof at the right side of the machine tool; and Fig. 16 is a similar diagrammatic view for the left side of the machine tool. The sequence of operations of the improved machine tool 20 at the right side, when semi-automatic operations are utilized, is set forth in the following outline:

*Sequence of operations—semi-automatic—right side*

1. Start hydraulic motor
2. Press close arbor button
   2.1 Bore slide forward operate. LS-6
      2.1.1 Stop bore slide forward
      2.1.2 Close chuck
3. Press cycle start button
   3.1 Start drive motor
   3.2 Bore slide forward
   3.3 Face slide forward
   3.4 LS-8 reverses face slide
   3.5 LS-9 reverses bore slide
   3.6 LS-10 stops bore slide reverse
4. Press chuck—open button
   4.1 Chuck open
      4.1.1 Releases LS-7 to reverse bore slide In the operation of the improved machine tool 20, either by manual or semi-automatic control, Fig. 8 shows the relative positions of the parts of the improved arbor chuck unit 29 when the chuck is open. Figs. 9 and 14 show the relative positions of the parts of the arbor chuck unit 29 when a workpiece 270' has been placed on the arbor 64–2 and the end 64–5 thereof is telescoped into the counterbore 36–58 of the tool slide arbor end 36–56, which is termed the arbor closed position.

The brake drum cylinder 271 has a relatively large diameter as compared with the diameter of the hub 259. The rotary drive of the chucked workpiece 270' is effected by means of one of the lugs 68–23 abutting against the threaded outer end of one of the rivet studs 273. The chuck jaws 86 do not drive the workpiece 270' but serve to dampen or resist vibration of the brake drum cylinder 271 relative to the hub 259.

When the chuck parts are in the open position as shown in Fig. 8, the tool or bore slide 36 has been retracted to its maximum position of displacement away from the arbor chuck unit 29. After the workpiece 270' has been placed on the arbor 64–2, the slide 36 is actuated to move forward towards the arbor chuck unit 29, there being a rapid travel of the tool slide until the tool slide arbor end 36–56 telescopes over the chuck arbor end 64–5. The chuck jaws then close, and the tool slide has a tool feeding travel slower than the rapid travel till the finish of the machining operations. During the reverse movement of the tool slide 36, there is a rapid travel until the tools clear the workpiece at the same intermediate location of the tool slide 36 at which the tool feeding travel commences. At this intermediate location the tool slide stops on the forward movement until the chuck closes and rotates. On the reverse movement of the tool slide 36 at this intermediate location the tool slide stops, the chuck is opened, and the further reverse movement of the tool slide is commenced.

It is noted that after the intermediate location of the tool slide 36 has been reached on the forward travel, the tool slide arbor shaft 36–35 becomes longitudinally stationary, but continues to rotate with and slide in the sleeve 36–31, during the tool feeding movement of the tool slide 36 and the reverse movement thereof to the intermediate location.

As above stated, the rotary arbor chuck unit 29, the tool slide 36, the main drive motor 150, the parts thereof and associated parts are at the right side of the vertical plane Y as shown on the drawings.

Symmetrically arranged on the left side of the plane Y, there is preferably provided in the improved machine tool 20 and improved automatic rotary arbor chuck unit 29–0, a tool slide 36–0 and a drive motor 150–0, which include parts and associated parts which are oppositely arranged as compared with the arbor chuck unit 29, the tool slide 36, and the drive motor 150, their parts thereof and associated parts.

The units at the left side of the machine tool 20 are operated similarly to the units at the right side, and the provision of two sets of opposite units enables the unloading of a finished brake drum from the arbor chuck unit at one side and the loading of a workpiece therein, while machining operations are being performed by the units at the other side.

In the foregoing description, certain terms have been used for brevity, clearness, and understanding, but no unnecessary limitations are to be implied therefrom, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable equivalents thereof obvious to those skilled in the art, are set forth in the appended claims.

I claim:

1. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having a pocket formed therein and the pocket opening through one end thereof, the axis of rotation extending through the pocket and the end opening thereof, chuck jaws operatively mounted in the mounting and guide member for movements towards and away from the axis of rotation and means for effecting the movements of the chuck jaws and the inner ends of the chuck jaws extending into the pocket, the mounting and guide member including a wall at the other end forming the bottom of the pocket, a cantilever arbor having one end portion mounted in the end wall of the mounting and guide member, other portions of the cantilever arbor extending in the pocket in the direction of the axis of rotation, power drive means for selectively rotating the rotatable parts of the arbor chuck unit, an arbor mounting slide operatively mounted on the base opposite the pocket opening end of the mounting and guide member for movements in the direction of the axis of rotation towards and away from the mounting and guide member, means for effecting the movements of the slide, and an arbor operatively mounted in the slide for rotation and sliding in the direction of the axis of rotation; the arbor of the arbor chuck unit having a longitudinal axis aligned with the axis of rotation, and the arbor of the slide rotating about the axis of rotation, each arbor having an end opposite the end of the other and each arbor end having means interengageable with the means of the other, and yielding means and stop means interposed between the slide arbor and the slide for permitting sliding movement of the slide arbor in the slide away from the arbor chuck unit.

2. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having an opening extending therethrough, the axis of rotation extending through the opening, chuck jaws operatively mounted in the mounting and guide member for movements towards and away from the axis of rotation and means for effecting the movements of the chuck jaws and the inner ends of the chuck jaws extending into the opening, the mounting and guide member including a wall spaced from the chuck jaws in the direction of the axis of rotation, a cantilever arbor having one end portion mounted in the wall of the mounting and guide member, other portions of the cantilever arbor extending in the opening in the direction of the axis of rotation and towards the chuck jaws, power drive means for selectively rotating the rotatable parts of the arbor chuck unit, an arbor mounting slide operatively mounted on the base opposite the chuck jaws for movements in the direction of the axis of rotation towards and away from the chuck jaws, means for effecting the movements of the slide, and an arbor operatively mounted in the slide for rotation and sliding in the direction of the axis of rotation; the arbor of the chuck unit having a longitudinal axis aligned with the axis of rotation, and the arbor of the slide rotating about the axis of rotation, each arbor having an end opposite the end of the other, and each arbor end having means interengageable with the means of the other, and yielding means and stop means interposed between the slide arbor and the slide for permitting sliding movement of the slide arbor in the slide away from the arbor chuck unit.

3. In a machine tool as set forth in claim 2, and in which the mounting and guide member includes a drive lug located in the opening.

4. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having a pocket formed therein and the pocket opening through one end thereof, the axis of rotation extending through the pocket and the end opening thereof, chuck jaws operatively mounted in the mounting and guide member for movements towards and away from the axis of rotation, and means for effecting the movements of the chuck jaws and the inner ends of the chuck jaws extending into the pocket, the mounting and guide member including a wall at the other end forming the bottom of the pocket, a cantilever arbor having one portion mounted in the end wall of the mounting and guide member, other portions of the cantilever arbor extending in the pocket in the direction of the axis of rotation, power drive means for selectively rotating the rotatable parts of the arbor chuck unit, an arbor mounting slide operatively mounted on the base opposite the pocket opening end of the mounting and guide member for movements in the direction of the axis of rotation towards and away from the mounting and guide member, means for effecting the movements of the slide, and an arbor operatively mounted in the slide for rotation and sliding in the direction of the axis of rotation, the arbor of the chuck unit having a longitudinal axis aligned with the axis of rotation and the arbor of the slide rotating about the axis rotation, each arbor having an end opposite the end of the other and each arbor end having means interengageable with the means of the other, and the mounting and guide member including a drive lug located in the pocket.

5. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having a pocket formed therein and the pocket opening through one end thereof, the axis of rotation extending through the pocket and the end opening thereof, chuck jaws operatively mounted in the mounting and guide member for movements towards and away from the axis of rotation, and means for effecting the movements of the chuck jaws and the inner ends of the chuck jaws extending into the pocket, the mounting and guide member including a wall at the other end forming the bottom of the pocket, a cantilever arbor having one portion mounted in the end wall of the mounting and guide member, and other portions of the cantilever arbor extending in the pocket in the direction of the axis of rotation, and the mounting and guide member including a drive lug located in the pocket.

6. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having an opening extending therethrough, the axis of rotation extending through the opening, chuck jaws operatively mounted in the mounting and guide member for movements towards and away from the axis of rotation, and means for effecting the movements of the chuck jaws and the inner ends of the chuck jaws extending into the opening, the mounting and guide member including a wall spaced from the chuck jaws in the direction of the axis of rotation, a cantilever arbor having one portion mounted in the wall of the mounting and guide member, and other portions of the cantilever arbor extending in the opening in the direction of the axis of rotation and towards the chuck jaws, and the mounting and guide member including a drive lug located in the opening.

7. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having an opening extending therethrough, the axis of rotation extending through the opening, chuck jaws operatively mounted in the mounting and guide member for movements towards and away from the axis of rotation, and means for effecting the movements of the chuck jaws and the inner ends of the chuck jaws extending into the opening, the mounting and guide member including a wall spaced from the chuck jaws in the direction of the axis of rotation, a cantilever arbor, adjustable means mounting one portion of the cantilever arbor on the wall of the mounting and guide member, and other portions of the cantilever arbor extending in the opening in the direction of the axis of rotation and towards the chuck jaws, and the mounting and guide member including a drive lug located in the opening.

8. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having an opening extending therethrough, the axis of rotation extending through the opening, chuck jaws operatively mounted in the mounting and guide member for movements towards and away from the axis of rotation, and means for effecting the movements of the chuck jaws and the inner ends of the chuck jaws extending into the opening, the mounting and guide member including a wall spaced from the chuck jaws in the direction of the axis of rotation, a cantilever arbor having one portion mounted in the wall of the mounting and guide member, and other portions of the cantilever arbor extending in the opening in the direction of the axis of rotation and towards the chuck jaws, and drive means on the mounting and guide member, the drive means being adapted for driving a part mounted on the cantilever arbor.

9. In a machine tool, a base, an arbor chuck unit mounted upon and extending angularly from the base, the arbor chuck unit including a housing and rotatable parts operatively mounted in the housing for rotation about an axis spaced from the base, the rotatable parts of the arbor chuck unit including an arbor mounting and chuck jaw guide member having an opening extending therethrough, the axis of rotation extending through the opening, chuck jaws operatively mounted in the mounting and guide member for movements towards and away from the axis of rotation, and means for effecting the movements of the chuck jaws and the inner ends of the chuck jaws extending into the opening, the mounting and guide member including a wall spaced from the chuck jaws in the direction of the axis of rotation, a cantilever arbor, adjustable means mounting one portion of the cantilever arbor in the wall of the mounting and guide member, and other portions of the cantilever arbor extending in the opening in the direction of the axis of rotation and towards the chuck jaws, and drive means on the mounting and guide member, the drive means being adapted for driving a part mounted on the cantilever arbor.

10. In a machine tool, a base, an arbor chuck unit mounted upon and extending angularly from the base, the arbor chuck unit including a housing and rotatable parts operatively mounted on the housing for rotation about an axis spaced from the base, the rotatable parts of the arbor chuck unit including an arbor and a chuck jaw mounting member extending radially with respect to the axis of rotation, chuck jaws operatively mounted on the mounting member for movements towards and away from the axis of rotation, the mounting member including a wall spaced from the chuck jaws in the direction of the axis of rotation, a cantilever arbor, adjustable means mounting one portion of the cantilever arbor on the wall of the mounting member, and other portions of the cantilever arbor extending from the wall in the direction of the axis of rotation and towards the chuck jaws, and drive means on the mounting member, the drive means being adapted for driving a part mounted on the cantilever arbor.

11. An arbor chuck unit for a machine tool and the like, the arbor chuck unit including a housing and rotatable parts operatively mounted on the housing for rotation about an axis, the rotatable parts of the arbor chuck unit including an arbor and chuck jaw mounting member extending radially with respect to the axis of rotation, chuck jaws operatively mounted on the mounting member for movements towards and away from the axis of rotation, the mounting member including a wall spaced from the chuck jaws in the direction of the axis of rotation, an arbor member, releasable means mounting the arbor member on the wall of the mounting member for movement radially with respect to the axis of rotation, and separate centering means for positioning the arbor member at a selected position with respect to the axis of rotation.

12. An arbor chuck unit for a machine tool and the like, the arbor chuck unit including housing and rotatable parts operatively mounted on the housing for rotation about an axis, the rotatable parts of the arbor chuck unit including an arbor and chuck jaw mounting member extending radially with respect to the axis of rotation, chuck jaws operatively mounted on the mounting member for movements towards and away from the axis of rotation, the mounting member including a wall spaced from the chuck jaws in the direction of the axis of rotation, an arbor member, releasable means mounting the arbor member on the wall of the mounting member for movement radially with respect to the axis of rotation, and drive means on the mounting member, the drive means being adapted for driving parts mounted on the arbor member.

13. An arbor chuck unit for a machine tool and the like, the arbor chuck unit including a housing and rotatable parts operatively mounted on the housing for rotation about an axis, the rotatable parts of the arbor chuck unit including an arbor and chuck jaw mounting member extending radially with respect to the axis of rotation, chuck jaws operatively mounted on the mounting member for movements towards and away from the axis of rotation, the mounting member including a wall spaced from the chuck jaws in the direction of the axis of rotation, an arbor member, releasable means mounting the arbor member on the wall of the mounting member for movement radially with respect to the axis of rotation, separate centering means for positioning the arbor member at a selected position with respect to the axis of rotation, and drive means on the mounting member, the drive means being adapted for driving parts mounted on the arbor member.

References Cited in the file of this patent

UNITED STATES PATENTS

| Number | Name | Date |
|---|---|---|
| 138,394 | Gray | Apr. 29, 1873 |
| 1,149,148 | Miller | Aug. 3, 1915 |
| 1,549,452 | Cole et al. | Aug. 11, 1925 |
| 1,885,848 | March | Nov. 1, 1932 |
| 2,171,282 | Wochner | Aug. 29, 1939 |
| 2,257,503 | Lange et al. | Sept. 30, 1941 |
| 2,379,307 | Lawson et al. | June 26, 1945 |